US006396977B1

(12) United States Patent
Dragone

(10) Patent No.: US 6,396,977 B1
(45) Date of Patent: May 28, 2002

(54) WAVELENGTH ROUTER WITH A WIDE PASSBAND REALIZED USING TWO GRATINGS OF OPPOSITE ANGULAR DISPERSIONS

(75) Inventor: Corrado Pietro Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/345,033

(22) Filed: Jun. 30, 1999

Related U.S. Application Data

(60) Provisional application No. 60/114,085, filed on Dec. 29, 1998.

(51) Int. Cl.[7] .................................................. G02B 6/28

(52) U.S. Cl. ............................. 385/24; 385/28; 385/37; 359/130

(58) Field of Search .............................. 385/24, 28, 14, 385/29, 37; 359/130

(56) References Cited

U.S. PATENT DOCUMENTS

| | | | | | |
|---|---|---|---|---|---|
| 5,629,992 | A | * | 5/1997 | Amersfoort et al. | 385/15 |
| 5,862,287 | A | * | 1/1999 | Stock et al. | 385/123 |
| 6,069,990 | A | * | 5/2000 | Okawa et al. | 385/43 |
| 6,141,152 | A | * | 10/2000 | Trouchet | 359/634 |
| 6,188,818 | B1 | * | 2/2001 | Han et al. | 385/24 |
| 6,195,482 | B1 | * | 2/2001 | Dragone | 385/28 |

* cited by examiner

*Primary Examiner*—Frank G. Font
*Assistant Examiner*—Michael P. Mooney
(74) *Attorney, Agent, or Firm*—John A. Caccuro

(57) ABSTRACT

The passband of an optical wavelength router is widened by using a combination of two grating apparatuses with opposite angular dispersions. The passband width approaches the channel spacing, with minimal loss penalty. This technique is particularly attractive for applications requiring a large number of ports with maximum passband width and relatively small loss. The optical wavelength router may be formed using either reflective or transmissive elements formed using grating apparatuses that are free space optical elements or waveguide gratings.

20 Claims, 16 Drawing Sheets

WAVELENGTH ROUTER WITH A WIDE PASSBAND REALIZED USING TWO GRATINGS OF OPPOSITE ANGULAR DISPERSIONS

RELATED APPLICATIONS

This application is based on a provisional application, Serial No. 60/114,085, filed on Dec. 29, 1998 and also entitled "WAVELENGTH ROUTER WITH A WIDE PASSBAND REALIZED USING TWO GRATINGS OF OPPOSITE ANGULAR DISPERSIONS."

TECHNICAL FIELD OF THE INVENTION

The present invention relates to multiwavelength routers for use in Wavelength Division Multiplexed (WDM) systems and, more particularly, to widening the passbands of a WDM using a combination of two gratings of opposite angular dispersion.

BACKGROUND OF THE INVENTION

Optical networks require efficient wavelength routers with minimal loss and maximum passband width. A wide passband for the router transmission coefficients is desirable because it reduces the need for accurate control of the transmitted wavelengths. It is also needed in channel adding/dropping filters, which must be designed with a maximally flat response, if many routers have to be concatenated. Often, each router is realized in integrated form as in reference [1], by using an imaging arrangement of waveguides (arms) having a constant path-length difference. (in this specification, a reference is designated by a number in brackets to identify its location in a list of references found in the Appendix) It is then possible to cause each transmission coefficient to approach a rectangular response by concatenating two integrated routers as shown in references [2–4]. This arrangement is suitable for integration on a single wafer, provided the number of ports is not too large. However, a limitation of that arrangement is the large size of the two waveguide gratings which makes it difficult to realize a wavelength router arrangement on a single wafer.

What is desired is a multiwavelength router having an increased number of wavelength channels with widened passbands.

SUMMARY OF THE INVENTION

In accordance with my invention, the passband of an optical wavelength router is widened by using a combination of two grating apparatuses with opposite angular dispersions. The passband width approaches the channel spacing, with minimal loss penalty. This technique is particularly attractive for applications requiring a large number of ports with maximum passband width and relatively small loss.

More particularly, an optical wavelength router comprises an input optical link, an output optical link, and an imaging arrangement including two gratings of different orders having essentially equal but opposite dispersions chosen so that an input wavelength transmitted from the input optical link to the output optical link essentially produces at the output optical link receiving aperture a stationary image whose intensity variation as a function of input wavelength produces a passband that is primarily determined by a transmission coefficient of the grating of higher order.

According to other aspects of our invention, the optical wavelength router may be formed using either reflective or transmissive elements formed using grating apparatuses that include free space optical elements or waveguide gratings. The optical wavelength router can be used as an optical signal multiplexer or demultiplexer.

My method of demultiplexing a wavelength division multiplexed (WDM) signal comprises the steps of: (1) receiving a WDM signal, forming therefrom an incident plane wave, and distributing it, (2) transforming a received incident plane wave into a set of planes waves of different orders having a first dispersion value, and (3) diffracting the set of plane waves with a second dispersion value essentially equal to and opposite of the first dispersion value and forming therefrom different wavelength signal of the WDM signal.

My method of multiplexing a plurality of wavelength signals into a wavelength division multiplexed (WDM) signal comprises the steps of: (1) transforming each of the plurality of wavelength signals into a set of planes waves having a first dispersion value and distributing the set of planes waves, and (2) diffracting the set of plane waves with a second dispersion value essentially equal to and opposite of the first dispersion value and forming therefrom the WDM signal.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is located in FIG. 1).

DETAILED DESCRIPTION

Figure 3:
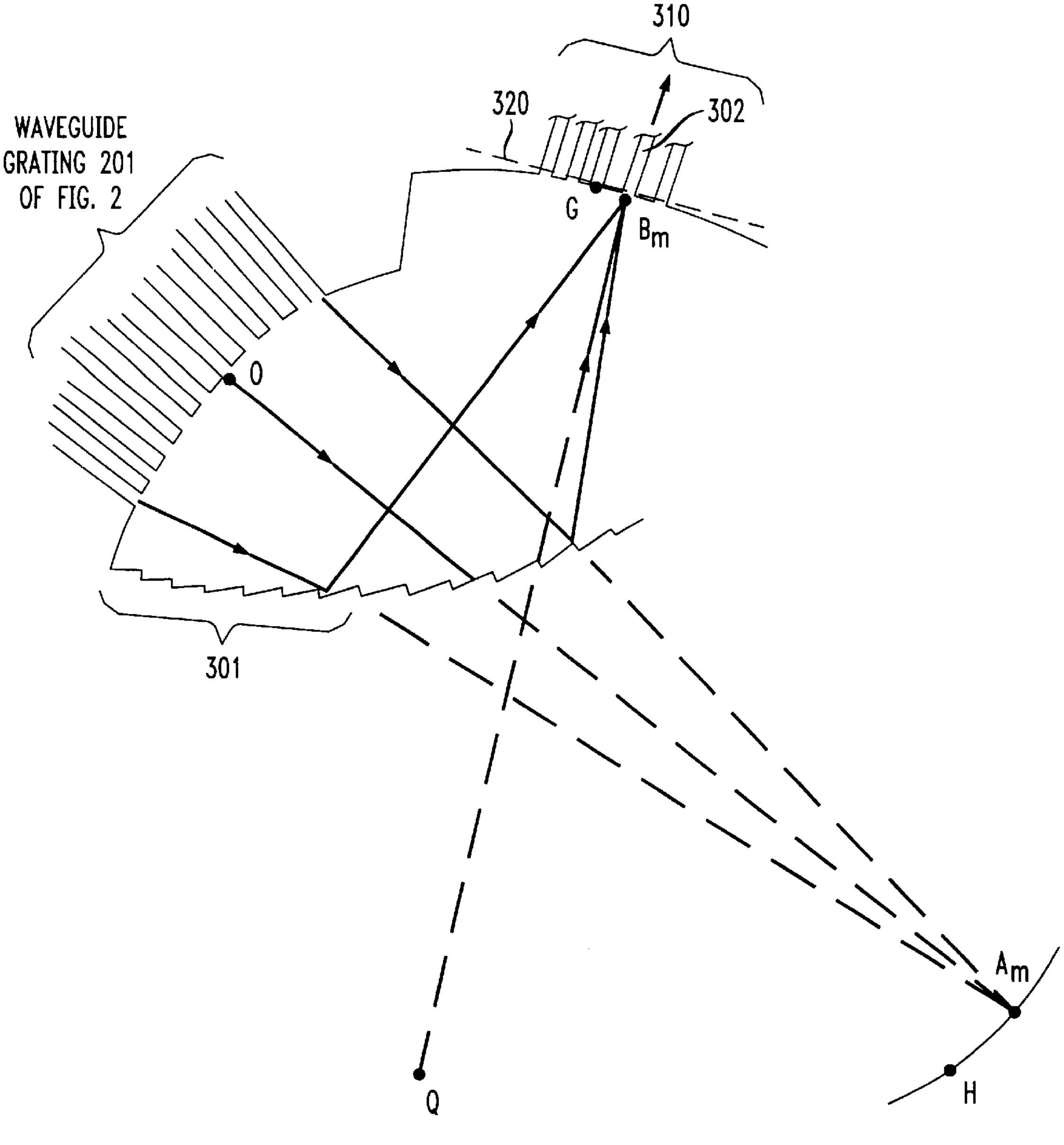
FIG. 3 illustrates a waveguide grating router constructed by combining the waveguide grating of FIG. 2 with a second grating of opposite angular dispersions. The second grating transforms the variable images produced in FIG. 2 into a set of stationary images that are received efficiently by the output waveguides.

A waveguide grating is generally advantageous in an optical router because of the rectangular element pattern approached by the grating radiation characteristics when suitable tapers are used [6], as shown in FIG. 1. This allows a wavelength router featuring maximally flat passbands and low levels of crosstalk to be realized as shown in FIG. 3 where a waveguide grating is directly combined with a conventional grating without need for additional filtering between the two grating as in reference [7]. Each transmission coefficient of this router is accurately produced by a particular order of the waveguide grating and the wavelength dependence of each transmission coefficient is primarily determined by the above element pattern. Therefore, a rectangular transfer function is obtained to a good approximation. An advantage of this router is that it can be realized in integrated form on a single wafer, by using a planar geometry based entirely on guided waves optics. However, if the number of channels is too large, so that integration on a single wafer is not possible, the above arrangement must be modified, by combining free-space optics and guided wave optics as discussed later. In order, to improve rejection in the stopbands, additional filtering may also have to be included between the two gratings as in reference [7]. To summarize, the techniques described here are needed when the number of ports is large, for instance 50, and they also have advantages of lower loss and lower crosstalk.

Detailed Description of Intergrated Arrangement

Figure 1A:
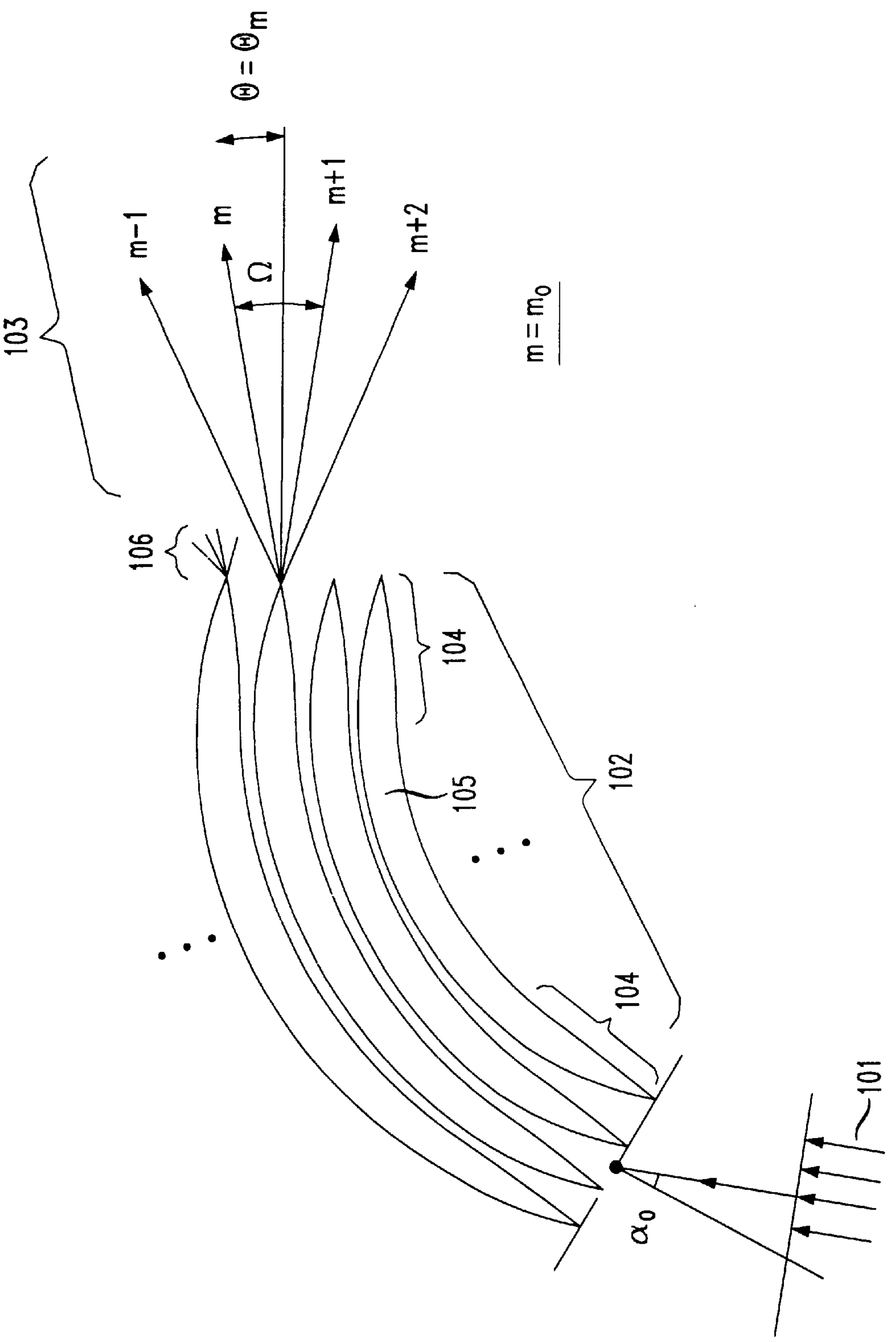
FIG. 1*a* illustrates a waveguide grating with suitable input and output tapers. An input wave incident with angle $\alpha_0$ is transformed by the grating into a set of plane waves of different orders.
Figure 1B:
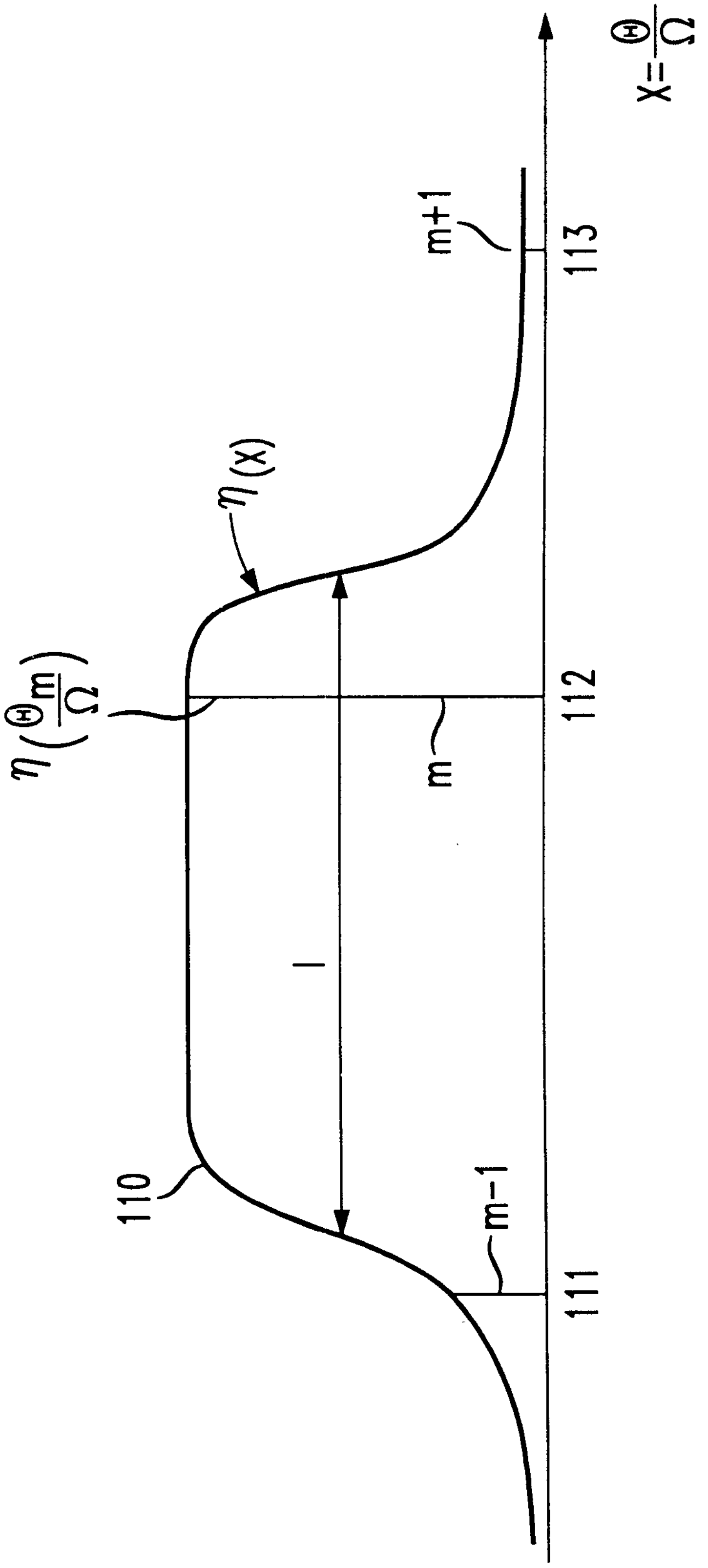
FIG. 1*b* shows that the intensities of the various orders are determined by the element pattern $\eta(\theta/\Omega)$ and that they approach a rectangular pattern by connecting the radiating ends of the arms of the grating to suitable tapered transitions.

As pointed out earlier, an advantage of using the waveguide grating is that a rectangular radiation pattern is obtained to a good approximation by using suitable tapers as in reference [6]. This is illustrated in FIG. 1*a,* where an incident wave 101 with angle of incidence $\alpha_0$ is transformed by a waveguide grating 102 into a set of output waves 103 of different orders. The angles $\theta_m$ specifying the directions of the various orders m vary with wavelength, and they are equally spaced by an angle $\Omega$ determined by the grating periodicity. The spacing $\Omega$ here is assumed to be very small, so that a large number of orders m is produced in the vicinity of a particular order $m_0$. Notice that the various orders m have in general different intensities. The intensity of each order m is a function of the angle $\theta=\theta_m$. This function, known as the element pattern, is determined by the radiation characteristics of the radiating array 104 formed by the final section of the grating arms 105. As shown in reference [6] it is possible, by properly tapering these sections 104, to obtain approximately a rectangular element pattern $\eta(\theta/\Omega)$ with angular aperture approximately equal to $\Omega$. As shown in FIG. 1*b,* the intensity of each order m for small angles is simply equal to $\eta(\theta_m/\Omega)$, neglecting losses and assuming unity intensity for the incident wave. Therefore, the element pattern 102 acts as a filter that approximately transmits only one order (m in FIG. 1*b*) at any given wavelength. Each order m is only transmitted efficiently in the vicinity of the particular wavelength $\lambda_m$ for which the angle $\theta_m$ is zero. Also notice that the variation of $\theta_m$ with wavelength will cause a corresponding intensity variation as a function of wavelength. In the wavelength router described next, each order m will produce one particular transmission coefficient, 111–113, of the router and, in order to maximize efficiency and minimize crosstalk, it is then important to produce a rectangular transfer function 110. For this reason, in order to obtain rectangular behavior 110, use of a waveguide grating 102 is advantageous, since the desired behavior in this case is simply obtained by including suitable tapers 104 in the waveguides as pointed out earlier.

Figure 2:
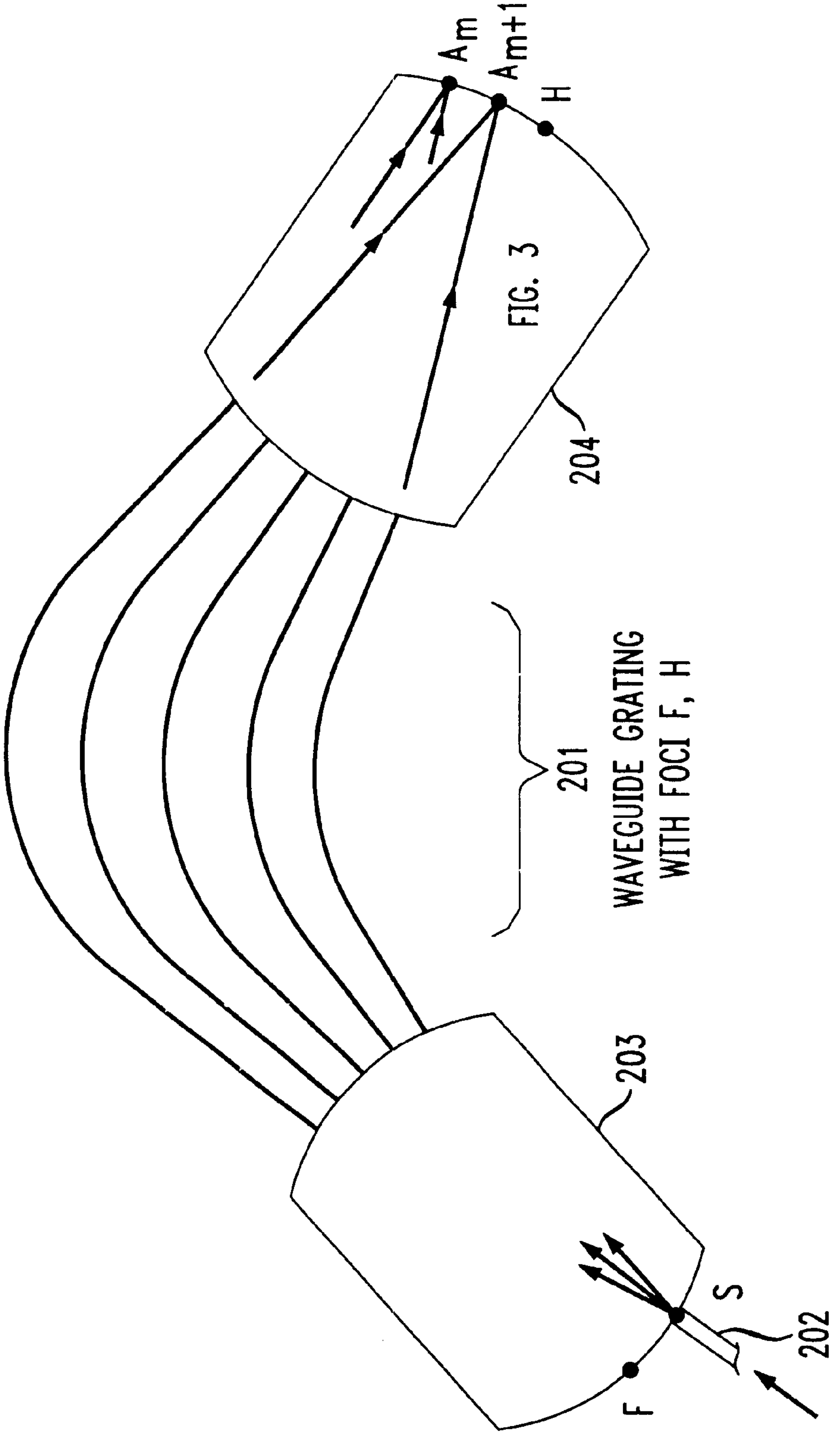
FIG. 2 shows an illustrative waveguide grating illuminated by an input waveguide s located in the vicinity of the first focus F which forms a set of images $A_m$ of different orders in the vicinity of the second focus H.

So far we considered in FIG. 1*a,* for simplicity, the special case of a grating 102 transforming an incident plane wave 101 into a set of plane waves 106. However, the same considerations apply to the general case. The main difference in the general case is that a radial wave (emanating for instance from an input waveguide) is transformed into a set of radial waves producing a set of images of different orders. In this case the initial and final sections of the arms, instead of being parallel as in FIG. 1 are directed radially towards two foci F, H as shown in FIG. 2. FIG. 2 shows a waveguide grating illuminated by an input waveguide S, 202, located in the vicinity of the first focus F in free space region 203. As a result, a set of images $A_m$ of different orders are produced in the vicinity of the second focus H in free space region 204. Notice by letting the two foci F and H go to infinity one obtains the arrangement of FIG. 1.

We next realize a wavelength router by combining the grating 201 of FIG. 2, having a first angular dispersion, with a second grating 301 of opposite angular dispersion as shown in FIG. 3. The purpose of the second grating 301 is to transform each order produced by the first grating 201 into a stationary image received efficiently by a separate output waveguide 302, as illustrated in FIG. 3. Thus, the second grating transforms the variable images produced in FIG. 2 into a set of stationary images that are received efficiently by the output waveguides 310. Each transmission coefficient is accurately given by the element pattern of the first array and it is approximately a rectangular function, as shown in FIG. 1*b*.

Notice the first grating 201 of FIG. 2 has foci F, H and it is illuminated by an input waveguide located at S, 202, in the vicinity of the first focus F. The second grating 301 is approximately curved with a hyperbolic profile having foci H, G. The first grating 201, illuminated by the input wave emanating from S, 202, produces in the vicinity of the focus H in FIG. 2 a set of variable images $A_m$ of orders $m=m_0$, $m_0\pm2$, . . . The second grating 301 then produces in FIG. 3 a corresponding set of images $B_m$ whose variations with wavelength are essentially the sums of the individual variations caused by the two gratings 201 and 301. Here the two gratings 201 and 301 are essentially designed with opposite angular dispersions, so as to essentially obtain a set of stationary images $B_m$, which can be received by separate waveguides 310 in FIG. 3.

In order to maximize efficiency the orientations of the output waveguides 310 must be properly chosen as follows. The axis of each waveguide must coincide with the central ray of the output wave received by the waveguide. The ray in question corresponds to the ray that passes through the center O of the first grating aperture. The second grating 301 transforms O into a variable image Q. In order to efficiently receive with each output waveguide 310 a particular order m in the vicinity of a particular wavelength $\lambda_m$, the waveguide 310 must be directed towards the image location Q produced at $\lambda_m$. Notice, by properly designing the arrangement so that Q is located at infinity, the output waveguides 310 become parallel. This particular choice may be advantageous for it allows a conventional array of parallel fibers to be used, in place of the radial waveguides 310 of FIG. 3, to receive the various orders. In this case the wafer must be cut along a line 320 through G, so that the fiber array can be properly attached to the wafer.

We next derive the general properties of a combination of two gratings of opposite dispersions. Notice dispersion by waveguide grating is given by the same well-known relations obtained for a conventional grating. Moreover, for small curvatures, a curved grating is equivalent to a planar grating combined with a lens, or a reflector. For this reason consideration will be restricted next to conventional gratings that are not curved.

Imaging by Two Gratings of Opposite Angular Dispersion

Figure 4A:
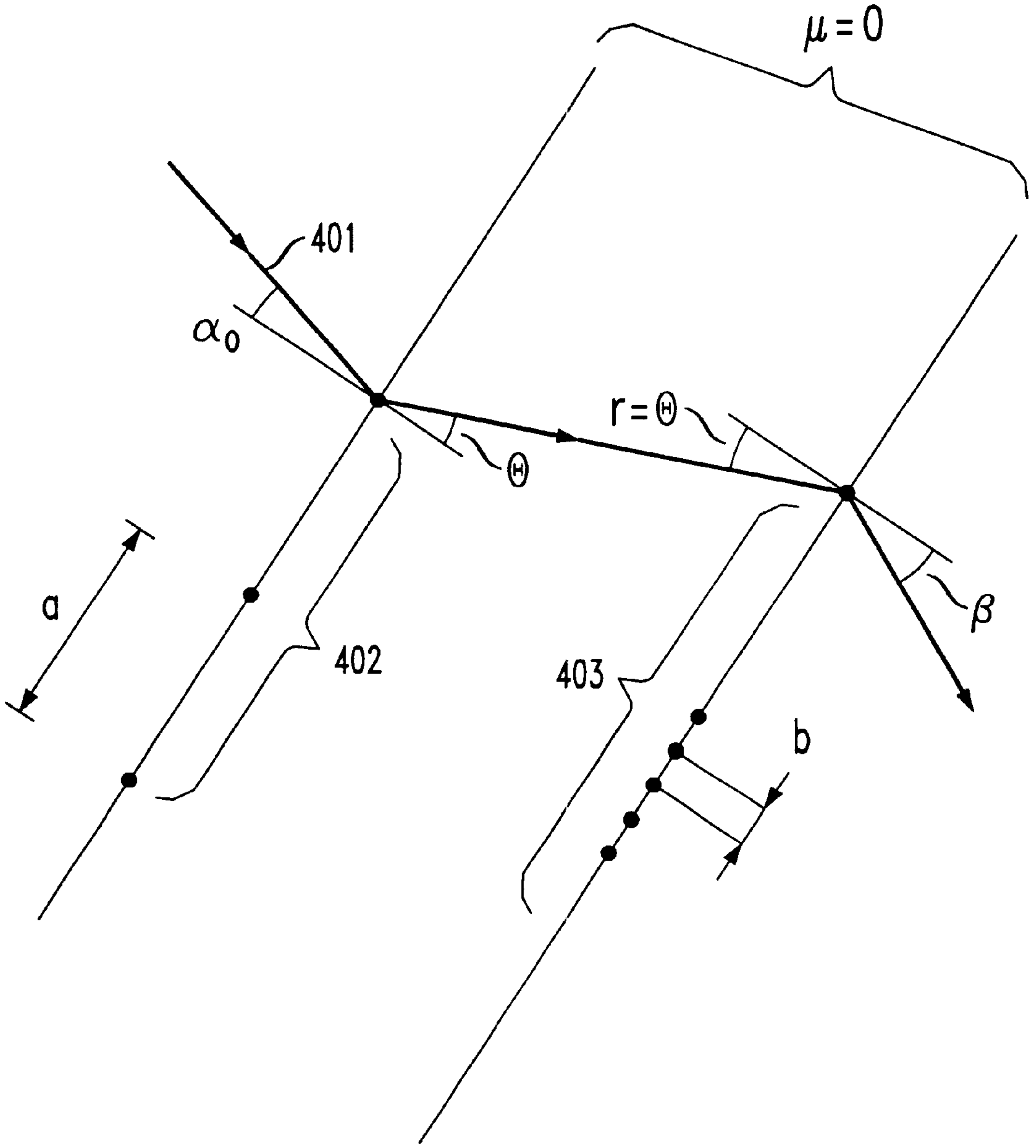
FIGS. 4*a* and 4*b* shows two illustrative grating arrangements having opposite angular dispersion in the vicinity of a particular order of the first grating and FIG. 4*c* shows a particular embodiment of a grating that can be used in FIGS. 4*a* and 4*b*.

With reference to FIG. 4*a,* the basic idea can be summarized as follows. A monochromatic wave 401 is separated by a periodic grating 402 into several diffracted components of different orders. The m-th order is characterized by strong wavelength dependence affecting both the direction and intensity of the diffracted wave. The direction variation with wavelength is determined by the grating angular dispersion θ and, the intensity variation, by the grating element pattern, "η". For a periodic grating consisting of identical elements (grooves) the element pattern is determined by the far-field diffraction pattern of an individual element. For an optimized grating, the diffracted intensity approaches 100% efficiency in the vicinity of the blazed diffraction angle, and it decreases gradually in the vicinity of this angle. The idea here is to combine the first grating 402 with a second grating 403 of opposite angular dispersion so as to obtain the following two properties. First, each diffracted wave direction becomes approximately stationary in the vicinity of the blazed angle. Second, the intensity of each diffracted wave is characterized by a well behaved variation, resulting in a relatively wide passband centered at the blazed wavelength. Then, by using the above arrangement, a wavelength router with well-behaved transmission coefficients, each having passband width close to the channel spacing, can be realized.

Figure 4B:
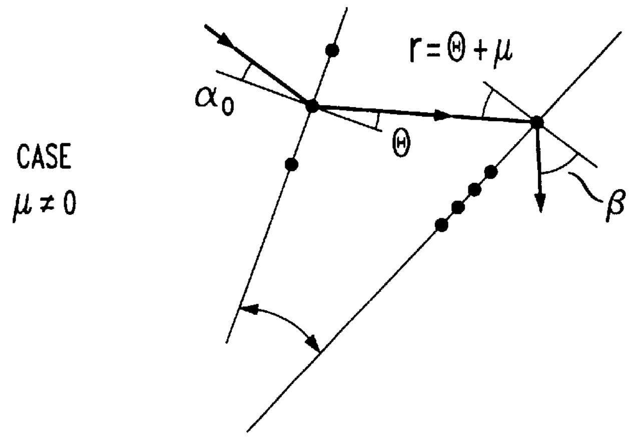

Our objective in the following is to optimize the transfer function of a wavelength router by using a combination of two conventional gratings. Advantages of this technique as compared to a previous technique [2] are larger number of channels, lower loss and lower crosstalk. The basic idea is illustrated by the example of FIG. 4*a,* where each grating may simply be a conventional diffraction grating, consisting of a transmissive or reflective surface including grooves of suitable shape as in FIG. 4*c*. However, it is important to realize that the relations specifying dispersion by a diffraction grating are not affected if each groove is replaced by a waveguide 201 as in FIG. 2. We consider for simplicity two parallel transmissive grating, 402 and 403 but the following considerations also apply to reflective gratings. Moreover, as shown in FIG. 4*b,* a nonzero angle $\mu$ may be used between the two gratings 402 and 403. We initially use free-space optics in which case the element pattern "η" is not a rectangular function. This is an important limitation for a demultiplexer if low levels of crosstalk are required, and additional filtering as in reference [7] may then be required as discussed later. On the other hand, for a multiplexer, higher levels of crosstalk are generally acceptable.

In FIG. 4, a monochromatic incident wave 401 of wavelength λ is diffracted twice, by the two gratings 402 and 403. The first grating 402 is described by the dispersion equation $$a(\sin \alpha_0+\sin \theta)=m\lambda \tag{1}$$

and, the second grating 403, by $$a(\sin \beta+\sin \gamma)=q\lambda \tag{2}$$

where the integers m,q are the diffraction orders and γ=θ since here we assume for simplicity two parallel gratings, with $\mu$=0. By eliminating the dispersion angles γ,θ we get $$\sin\beta = \sin\alpha_0 + \left(\frac{q}{b} - \frac{m}{a}\right)\lambda \tag{3}$$

which is the dispersion equation specifying the variation of β with λ for a given $\alpha_0$. We consider particular values $m=m_0$, $q=q_0$ and design the arrangement so that $$\left(\frac{q_0}{b} - \frac{m_0}{a}\right)\lambda = 0 \tag{4}$$

at a particular biased wavelength $\lambda_0$ of maximum transmission by the first grating element pattern. Then from equation (3) the diffraction angle β for $m=m_0$ becomes independent of λ, $$\sin \beta=\sin \alpha_0,\ (m=m_0,\ q=q_0) \tag{5}$$

and, therefore, the diffracted wave becomes stationary. That is, all wavelengths exit grating 403 at the same diffraction angle β.

Figure 4C:
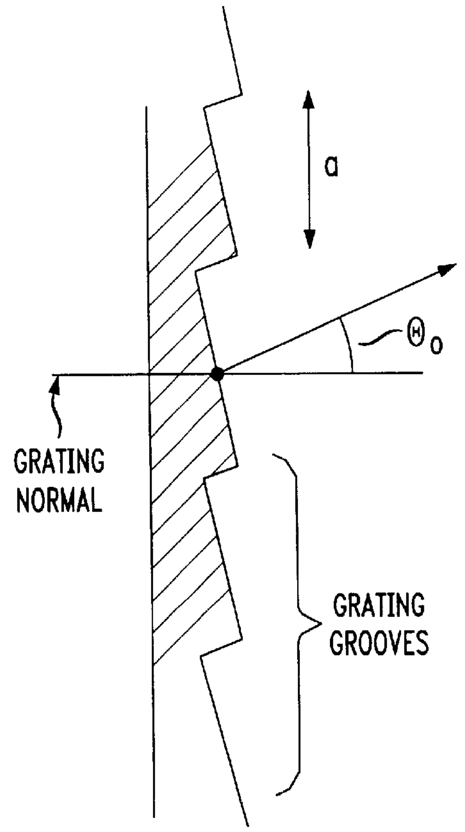

On the other hand, the intensity of the diffracted wave is not stationary, but varies with wavelength. In fact, consider a particular design satisfying the above condition (5) with efficiencies close to 100% at a specified design wavelength $\lambda_0$ and let $\theta=\theta_0$ for $\lambda=\lambda_0$. Further assume that $$m_0>>q_0. \tag{6}$$

giving a>>b because of (4). Then the total efficiency in the vicinity of the blazed wavelength $\lambda_0$ is primarily determined by the efficiency of the first grating and one obtains approximately $$\eta(X) = \left(\frac{\sin(\pi X)}{\pi X}\right)^2 \tag{7}$$

where for small angles θ

$$X \simeq \frac{a}{\lambda}(\sin \theta - \sin \theta_0) \simeq \frac{(\theta - \theta_0)}{\Omega}, \tag{8}$$

with Ω≈λ/a, assuming that the grating essentially consists of a periodic array of elements with flat front and back surfaces as shown for instance in FIG. 4*c*. A wavelength router can now be realized as in FIG. 5 by using an input waveguide 501 combined with a collimating lens 502, producing the incident wave 503 of angle $\alpha_0$ to the first grating 402. The second (decollimating) lens 505 then transforms the diffracted wave 504 of angle , specified by equation (5) into a converging wave received by an output waveguide, e.g., 506. The resulting transmission coefficient is accurately given by the expressions (7,8) with $$\sin\theta - \sin\theta_0 = m_0(\lambda - \lambda_0) \quad (9)$$

So far we considered a particular order $m=m_0$ produced by the first grating. Next consider other orders $$m = m_0 \pm 1,\ m_0 \pm 2,\ \text{etc.} \quad (10)$$

For each of these orders, let $\lambda_m$ denote the blased wavelength for which the first diffraction angle is exactly $\theta_0$. Then from equation (1)

$$m\lambda_m = m_0\lambda_0 \quad (11)$$

and, from equation (3) for $q=q_0$ and $m \neq m_0$, the angle $\beta$ produced by the second grating for $q=q_0$ is now given by $$\sin\beta = \sin\alpha_0 - \frac{m - m_0}{a}\lambda \quad (12)$$

Figure 5:
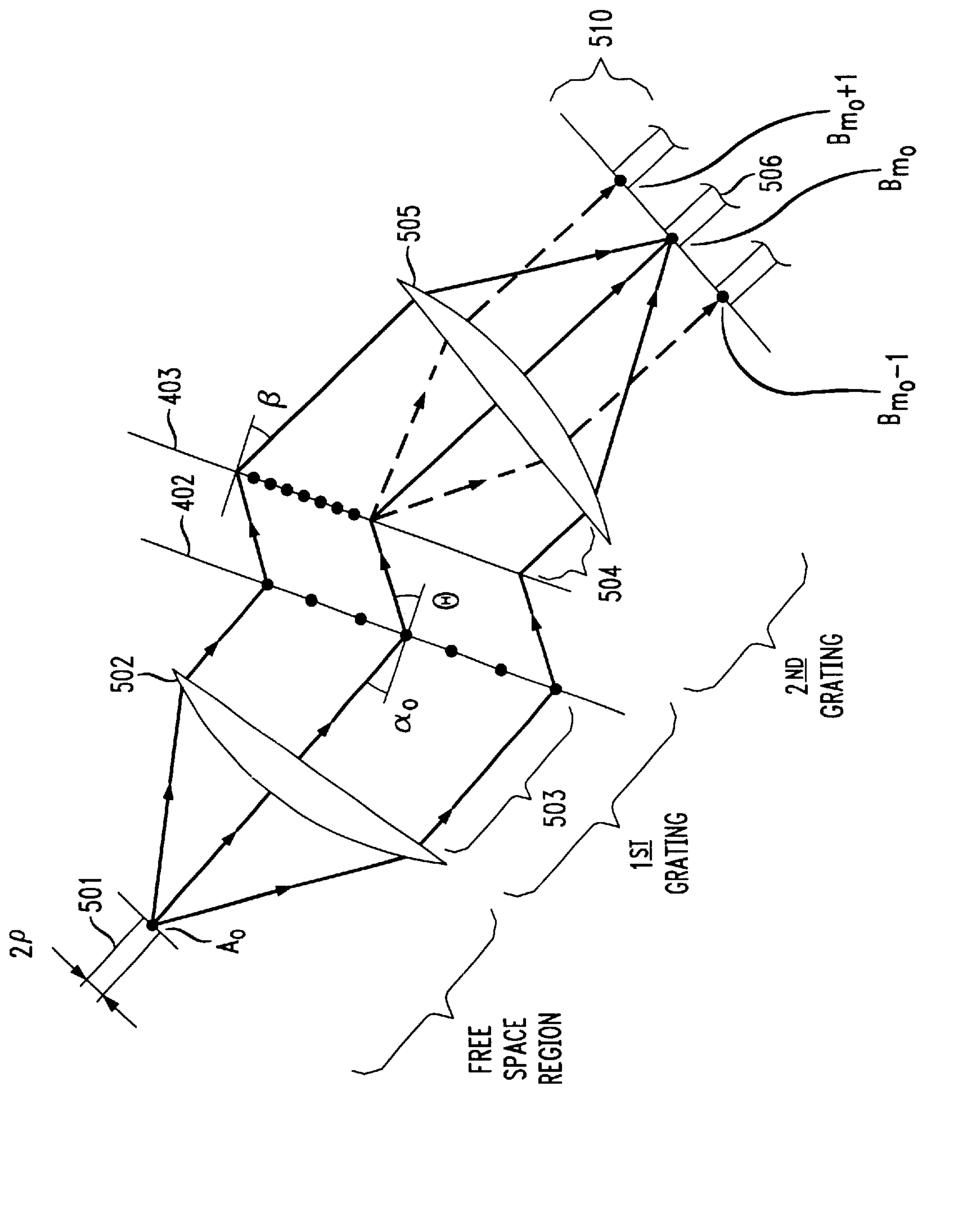
FIG. 5 shows an imaging arrangement incorporating two gratings of opposite angular dispersions. Each order produced by the first grating is transformed by the second grating into a stationary wave that is focused into a receiving waveguide.
Figure 6:
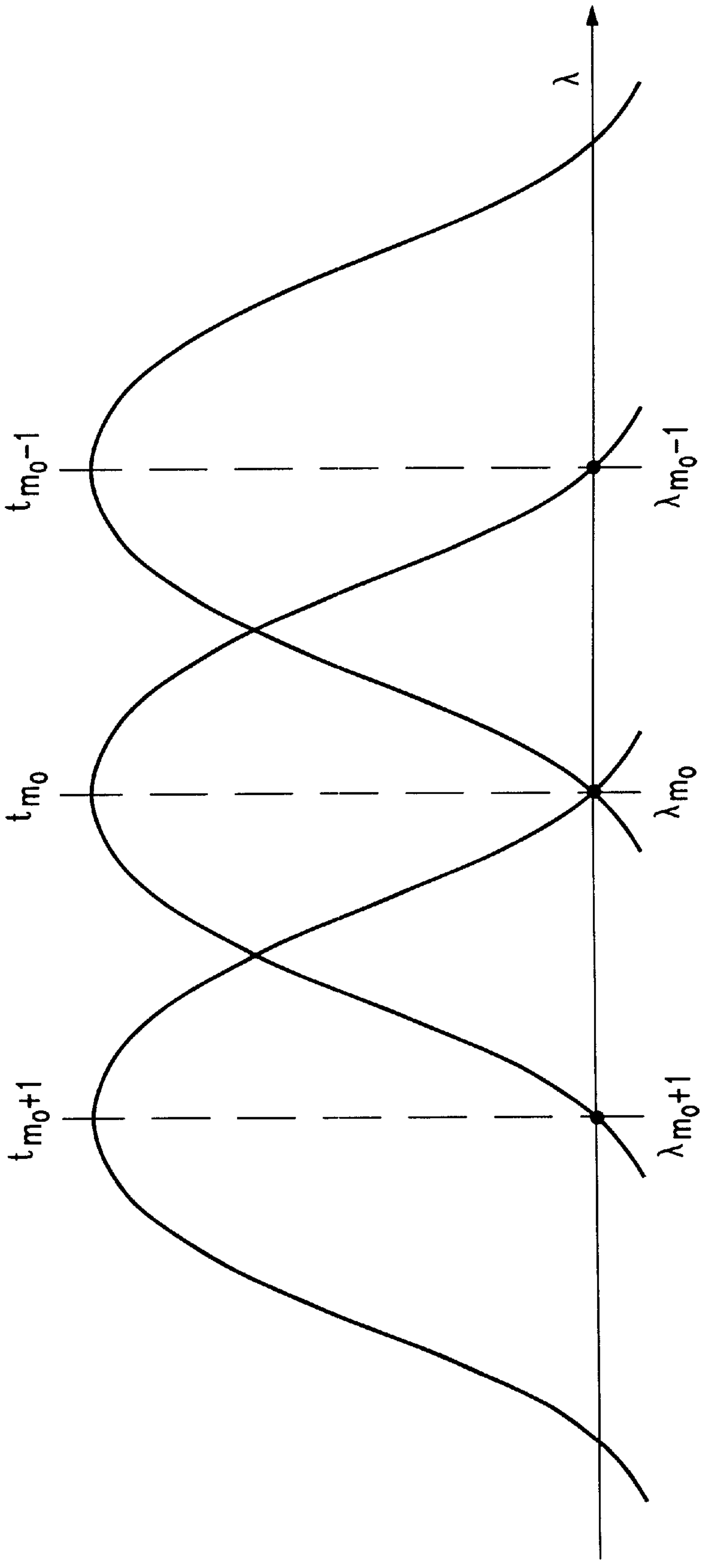
FIG. 6 shows the transmission coefficients for the arrangement of FIG. 5 corresponding to the various orders of the first grating.

We denote by $\beta_m$ the particular value of $\beta$ for $\lambda=\lambda_m$ and include in the arrangement of FIG. 5 a set of receiving waveguides 510, each positioned so as to optimally receive a particular order in the vicinity of its biased wavelength $\lambda=\lambda_m$. One can see from equation (12) that the angle $\beta$ is not exactly stationary for $m \neq m_0$. However, if the difference $m-m_0$ is small enough as compared to $m_0$as shown later, the incident wave for the m-th output waveguide still accurately satisfies the expressions (7,8) with sin $\theta$ given by equation (1) for $m \neq m_0$. We have thus realized a wavelength router approximately characterized by the transmission coefficients, e.g., $t_m$, shown in FIG. 6. Each transmission coefficient is theoretically unity at a particular biased wavelength $\lambda_m$, and it is small (theoretically zero) at all other wavelengths $\lambda_m$.

Figure 12A:
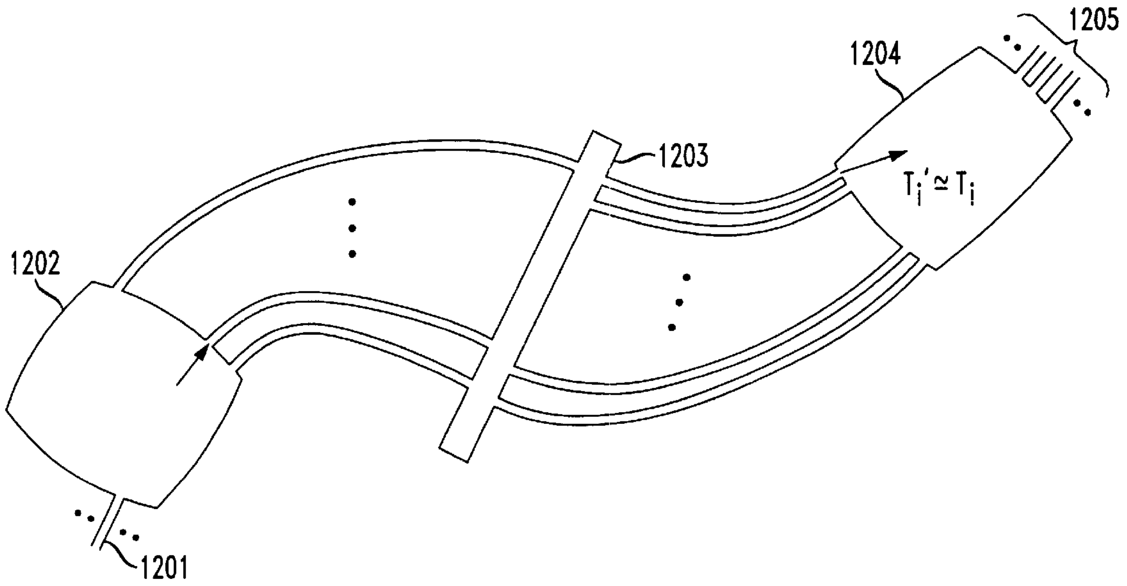
FIG. 12*a* shows a planar arrangement of two transmissive waveguide gratings.
Figure 12B:
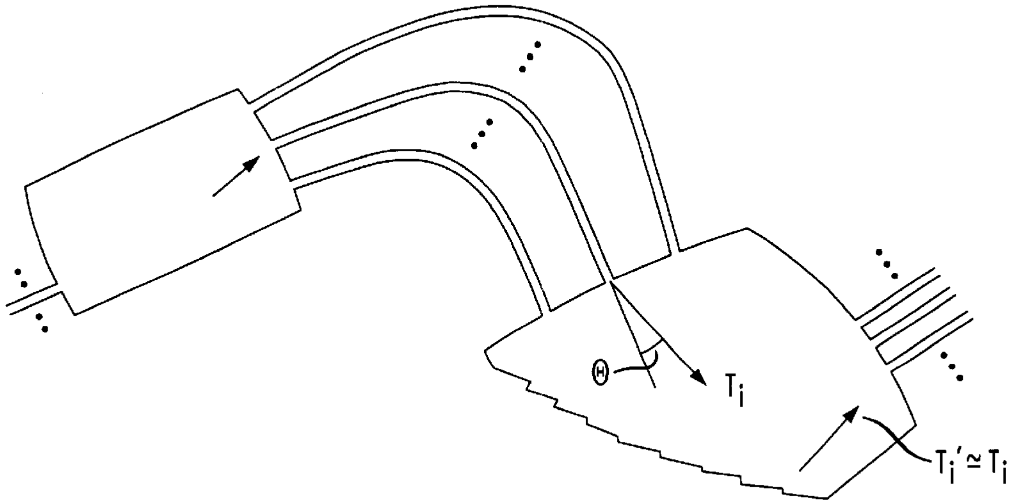
FIG. 12*b* shows a planar arrangement including a transmissive waveguide grating and a reflective waveguide grating.
Figure 12C:
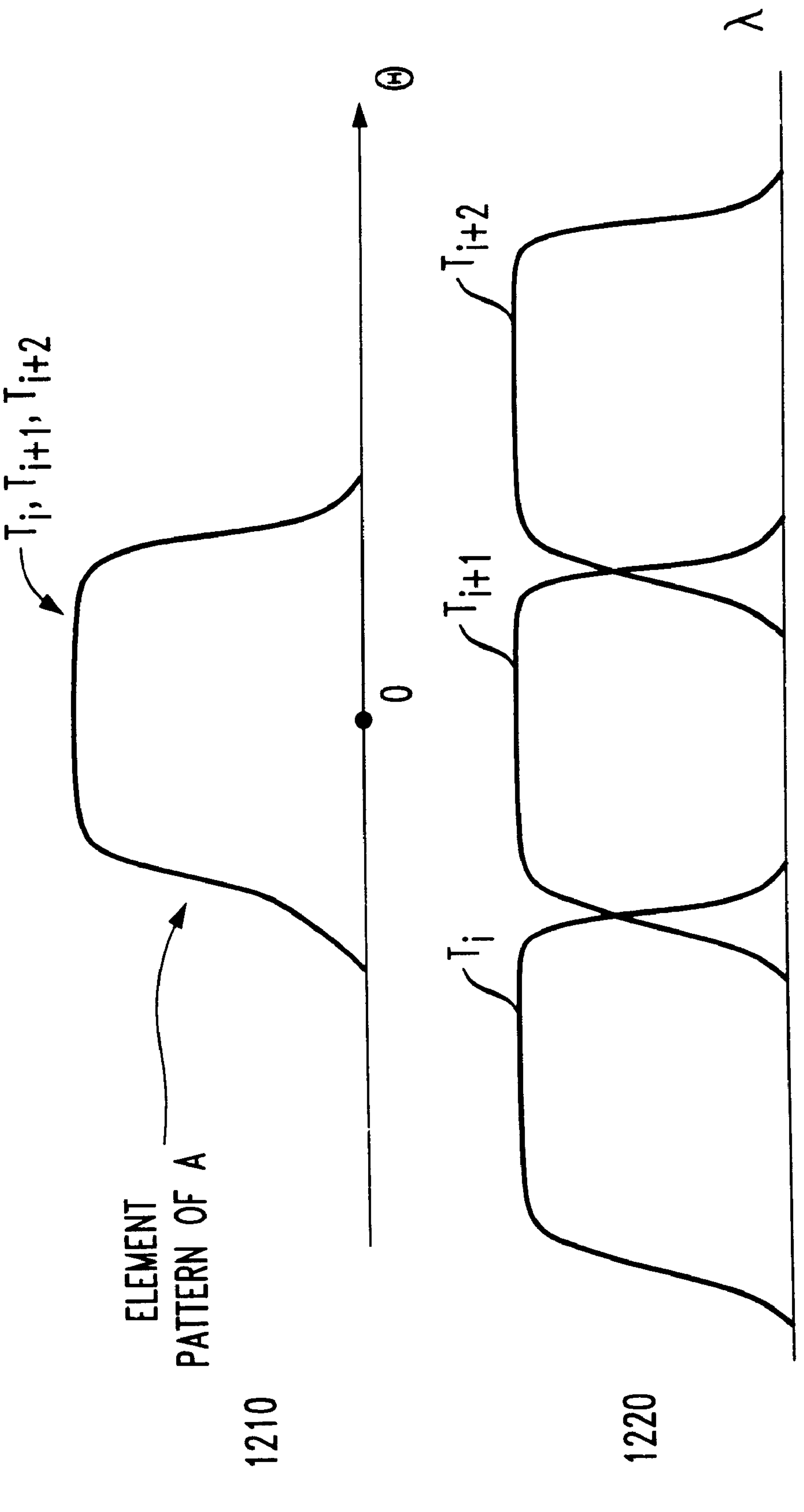
FIG. 12*c* shows the illustrative transmission characteristics for the element pattern of A.

The arrangement of FIG. 4 can be realized in integrated form as shown in FIG. 12 by using a waveguide grating combined with a reflective grating or, as in FIG. 12*c,* by using two waveguide gratings. By then using efficient transitions as in U.S. Pat. No. 5,039,993 one can cause the efficiency given by the element pattern of the first grating to approach a rectangular function, $$\eta \approx rect(X),$$

Figure 13:
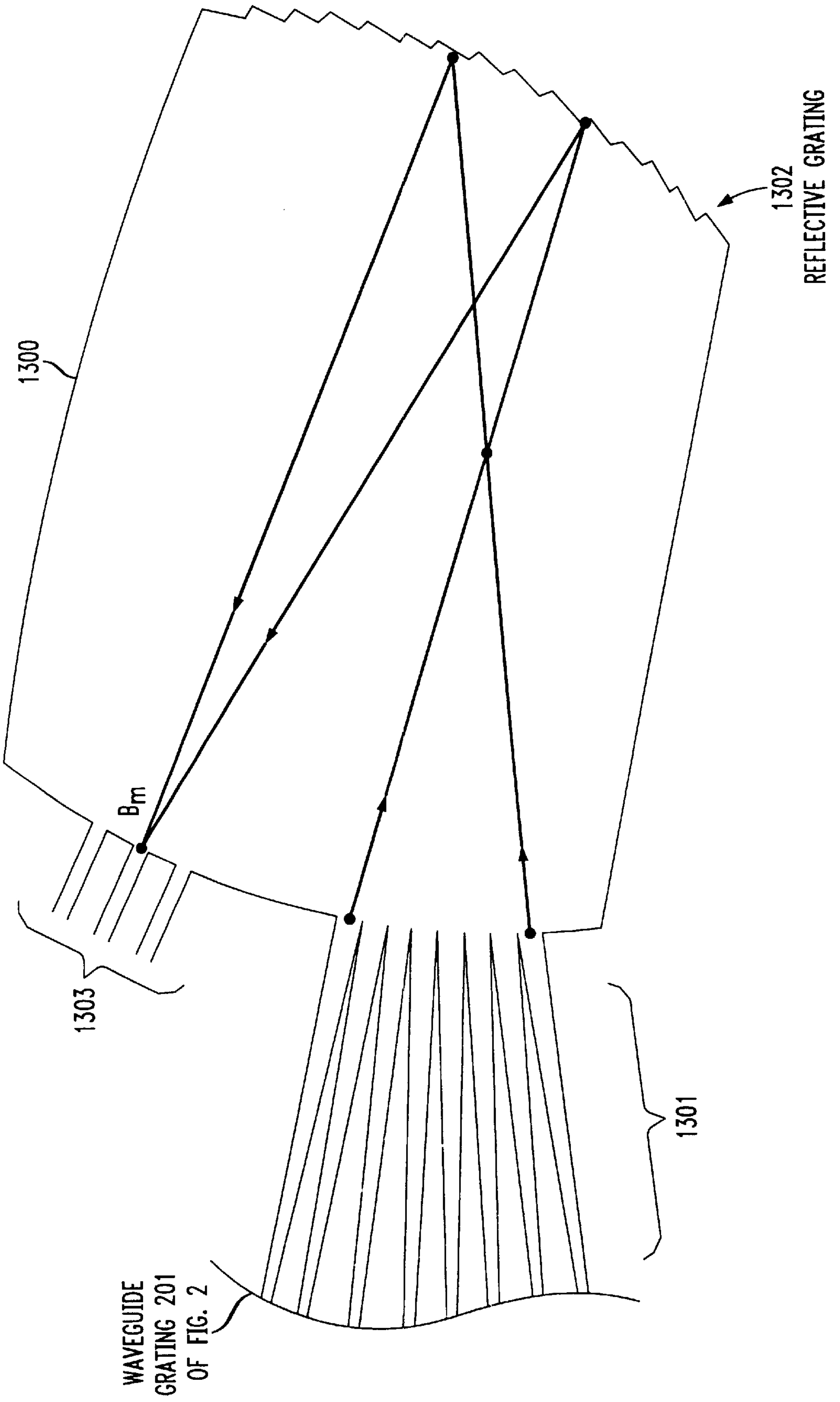
FIG. 13 shows an alternate arrangement of FIG. 3 obtained by combining a reflective waveguide grating with a conventional grating.

In practice, as discussed earlier, it is desirable in general to reduce the size of this arrangement by replacing the second waveguide grating with a reflective grating as in FIGS. 3, 13.

Figure 7:
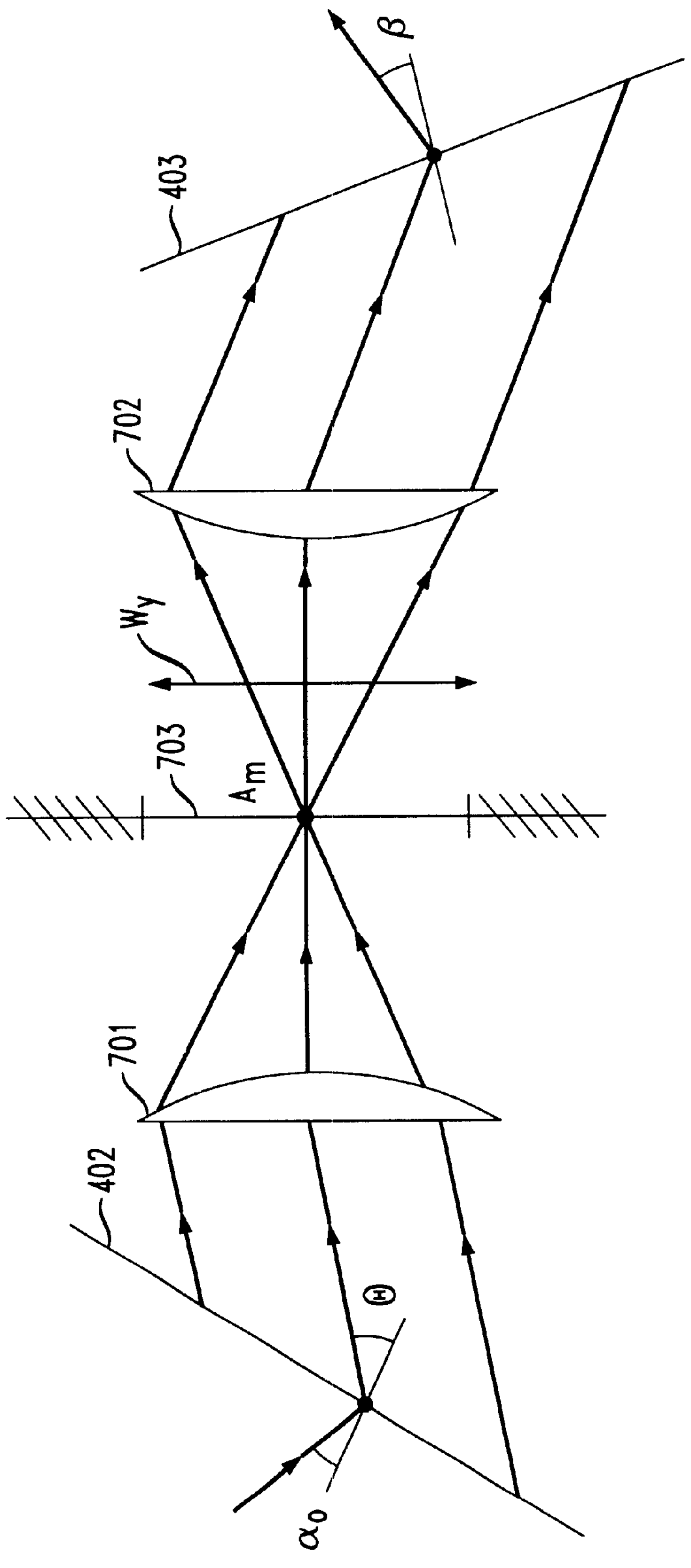
FIG. 7 illustrates a modification of FIG. 5 including an imaging arrangement of two lenses and a stop of suitable aperture, each transmission coefficient in FIG. 5 is effectively multiplied by the rectangular function shown in FIG. 8.

Notice, by reversing the sense of transmission, the arrangements considered so far perform as multiplexers, and they will efficiently multiplex many wavelengths into a single output fiber. On the other hand they do not perform well as demultiplexers, since the element pattern of the first grating does not provide the high levels of rejection that are typically required outside the stopbands of a demultiplexer. It is therefore desirable for a demultiplexer to modify the above arrangements by including additional filtering as in reference [7], so as to improve the transmission coefficients as discussed next. For a demultiplexer, one would like in general the m-th transmission coefficient to be essentially zero outside a suitable passband interval centered around the wavelength $\lambda_m$ of unity transmission. This can be realized as in FIG. 7 by including between the two gratings 402, 403 an imaging arrangement of one or more lenses 701, 702 combined with an aperture stop 703. Each diffraction order now produces between the two gratings an image $A_m$ of the input waveguide location $A_0$. The image location in FIG. 7 is approximately a linear function of the wavelength and, at the biased wavelength $\lambda_m$, the image is produced at the center of the aperture 703. Taking into account that the transmission coefficient is essentially zero when the image is produced outside the aperture 703, each transmission coefficient is now approximately multiplied by a rectangular aperture function, $$\left(\frac{\sin(\pi X)}{\pi X}\right)^2 rect\left(\frac{y}{W_y}\right), \quad (13)$$

where y the image coordinate from the center of the aperture and $W_y$ is the aperture width. In practice, the above expression is only valid if the input waveguide 501 width ($2\rho$ in FIG. 5) is small enough as compared to $W_y$, and a more accurate expression is obtained as follows.

Figure 8A:
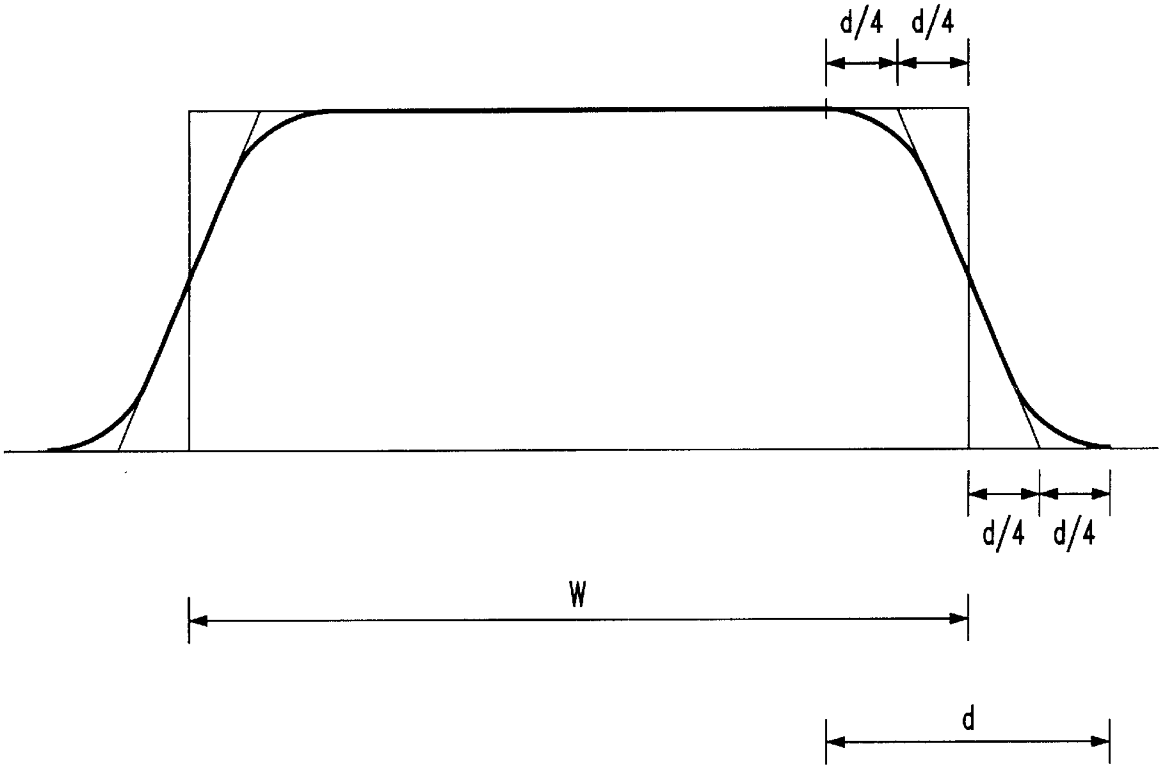
FIG. 8 shows the rectangular function produced by the aperture function of FIG. 7.
Figure 8B:
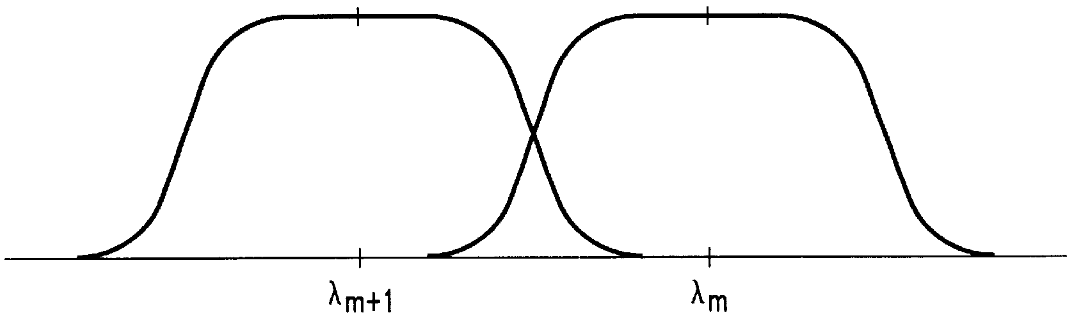

In FIG. 7 the first diffracted wave produces at $A_m$ an image of the mode of the input waveguide. The image location $A_m$ is determined by its coordinate y. Inside the interval corresponding to the aperture stop for $$|y| < \frac{W_y}{2}$$

the transmission coefficient is little affected, whereas it is approximately zero outside this interval, and therefore one obtains the approximate expression (13). More accurately, one must take into account the finite width of the image. Then, denoting by d the image width, one must replace the distribution (13) with the one sketched in FIG. 8.

Figure 9:
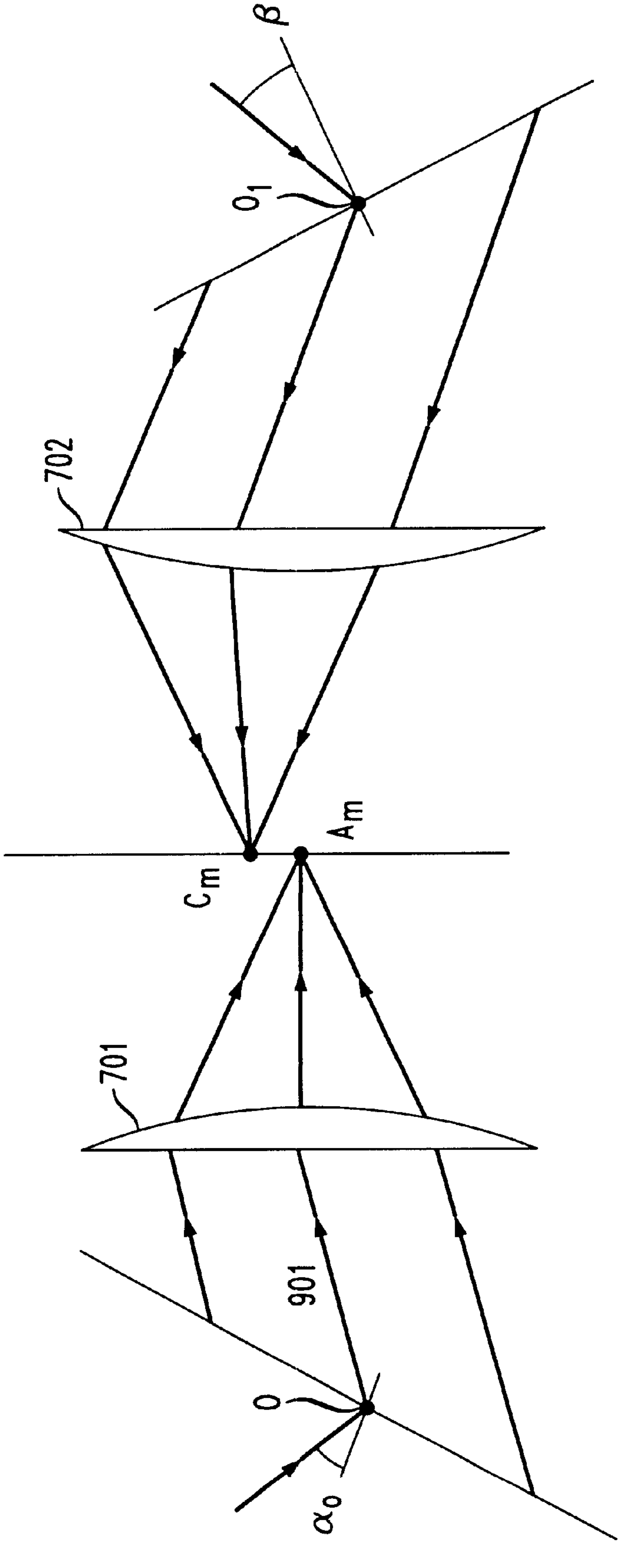
FIG. 9 shows that the mismatch arising when the two gratings in FIG. 5 do not have exactly opposite angular dispersions causes different images to be produced in the focal plane of FIG. 7.

So far we assumed that $m-m_0$ is small enough, so that the angle $\beta$ is not too different from the value $\beta_m$ specified by the blazed wavelength $\lambda_m$. We now determine how small $m-m_0$ must be. Notice that the difference $\beta-\beta_m$ causes the output wave converging towards the m-th output waveguide to be displaced from the waveguide location. The displacement dx determined by the difference $\beta-\beta_m$ can be calculated by using equation (2). One finds that dx is approximately proportional to the wavelength difference $\lambda-\lambda_m$, and one can verify that this difference remains less than 0.5 $\lambda$/m over the entire passband interval centered at $\lambda_m$. Over this entire interval, the displacement must be small enough to cause negligible mismatch loss. Therefore, we require the displacement dx to be less than one eighth of the waveguide width $2\rho$, $$|dx| < 0.225\rho, \quad (14)$$

and obtain the condition $$\frac{m - m_0}{m} < 0.45\frac{2\rho}{D}. \quad (15)$$

where D is the spacing of the output waveguides. Notice a similar relation can be derived as follows by reversing the sense of transmission in FIG. 7. By applying an input signal $B_m$ to the m-th output waveguide (e.g., 506 of FIG. 5), an image $C_m$ will be produced in the aperture plane of the stop, as shown in FIG. 9. The image $A_m$ is produced by the input waveguide, and it is intended for the output waveguide $B_m$. One finds that for $m \neq m_0$ the image $C_m$ is displaced from the image $A_m$ produced by the input waveguide. By requiring the displacement dx to be less than one eighth of the mode width d, over the entire aperture of the stop, we obtain condition (15), with 2ρ now replaced by the mode width d and D by the stop width $W_y$. One can show that the above condition will insure less than 0.5 dB of loss penalty caused by dx, for typical waveguides. From the above expression, by choosing the ratio $$\frac{2\rho}{D}$$

appreciably smaller than 10, a large value of $m-m_0$ will be obtained, since typically $m_0$ is large.

Figure 10:
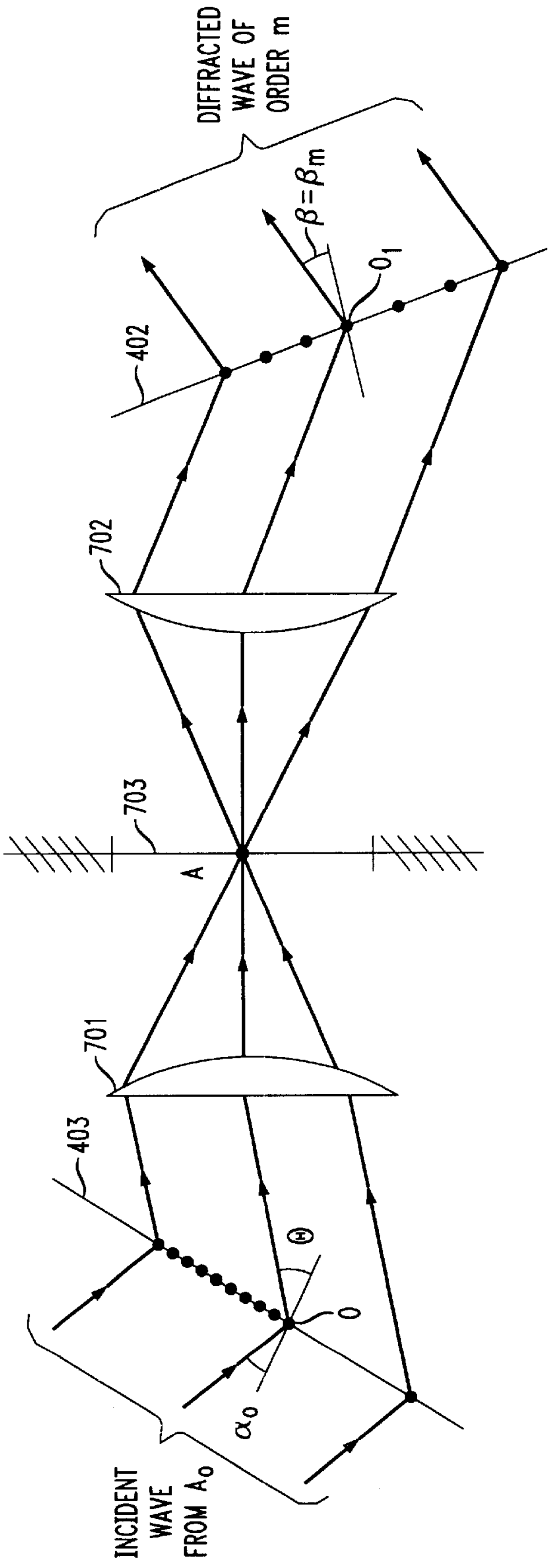
FIG. 10 shows an arrangement obtained by interchanging the two gratings of FIG. 5.

We have ignored so far an additional mismatch that may arise in FIG. 9, even when the two images are produced at the same location. In order to insure a good mismatch, the central rays producing the two images must have the same direction, to a good approximation. This condition is only approximately satisfied in FIG. 3. On the other hand, it can be satisfied accurately in FIGS. 9 and 10 provided the distance of each grating from the corresponding lens is equal to the focal length of the lens, and the same condition must be satisfied in FIG. 11, which involves reflectors instead of lenses. Notice that the above condition is needed in order for the central ray through O to intersect the second grating at a stationary point $O_1$, which can then be viewed as an image of O. In FIG. 3, on the other hand, in order for the above mismatch to be small, the separation of O from the reflective grating must be small, as compared to the total distance of O from H. In FIG. 4, the above mismatch is negligible provided the separation of the gratings is small as compared to their transverse dimension.

As an example, assume a channel spacing of about 400 GHz and let λ be about 1550 nm. Then one must choose $m_0=481$ and for $$\frac{W_y}{d} = 3.6$$

we obtain $|m-m_0|<50$, showing that the number of channels can be as large as 100, which is more than enough for most applications.

Applications

Clearly an N×N router can be realized by including many input waveguides (e.g., 202 and 505). For some applications it may be desirable to choose the diffraction integer $m_0$ as an integer multiple of $q_0$. Then the transmission coefficients become essentially periodic, with free-spectral range determined by $q_0$, and one obtains properties similar to those discussed in references [1,2]. Also notice that we assumed so far that the first grating 402 is of order much larger than the second grating 403. However, similar results are obtained by interchanging the two gratings as shown by 403 and 402 in FIG. 10. The intermediate image A is now produced by a grating 403 of small order $q_0$. The second grating 402 then produces a set of stationary waves of orders m received by the various output waveguides. Consideration will be restricted next to his particular arrangement.

As a first application consider the above arrangement. Let the total number of output ports be 50, and let their transmission coefficients (of FIG. 6) be spaced by 800 GHz. Assume that each passband contains four channels spaced by 100 GHz. The total number of channels is then 200, and the above arrangement will separate (or combine) them in groups of 4.

Figure 11:
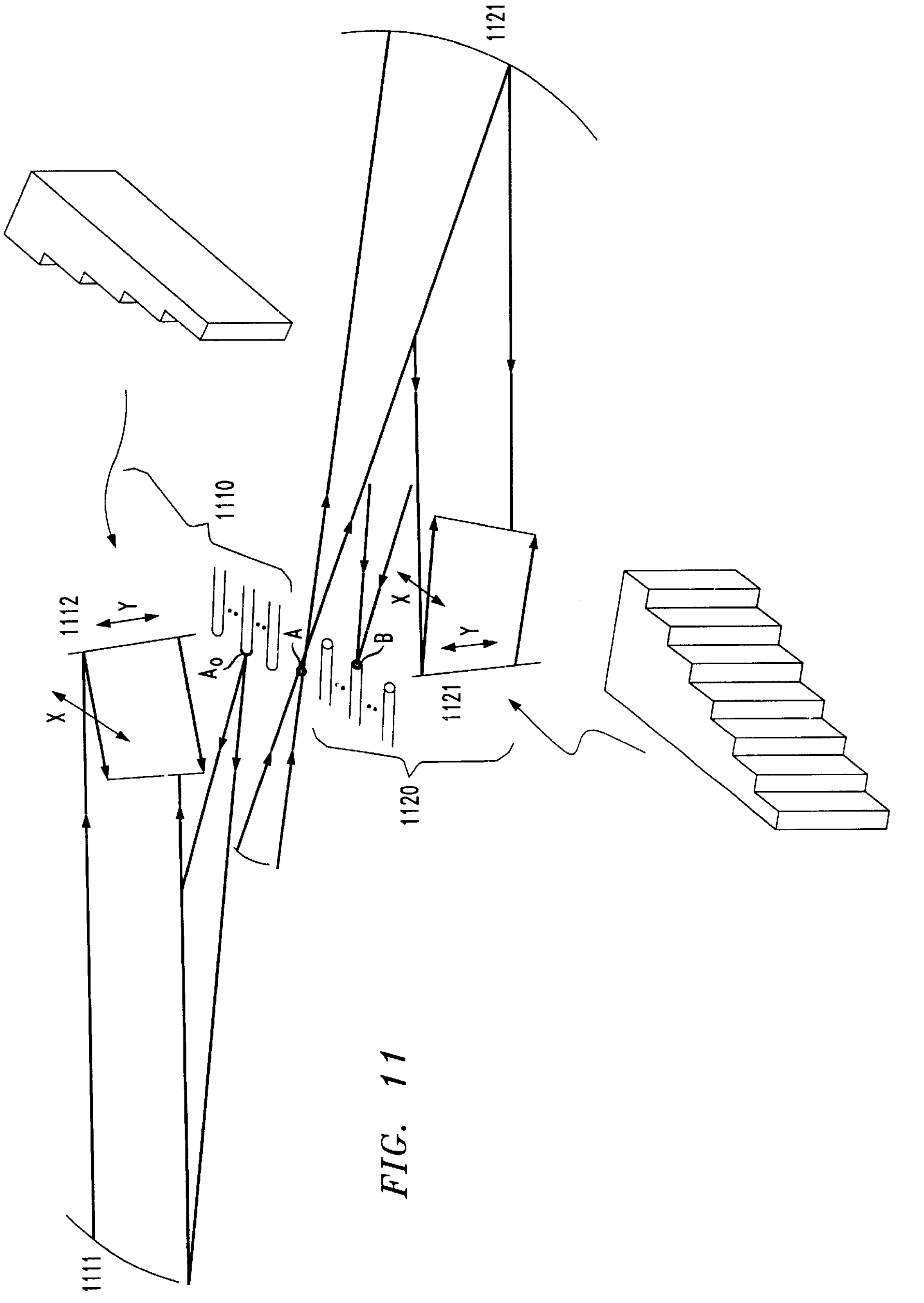
FIG. 11 shows the arrangement of FIG. 5 realized by a combining two imaging arrangements, each including a reflective grating.

In practice, the above arrangement is best realized using reflectors, 1111 and 1121, as shown for instance in FIG. 11. This arrangement consists of two sections, 1110 and 1120, each consisting of a grating, 1112 and 1122, combined with a reflector, 1111 and 1121, respectively, and the total loss can be as low as 3 dB. The first section transforms the input wave $A_0$ emanating from an input waveguide into the intermediate image A which is then transformed into a set of images B received by the output waveguides. This figure shows the symmetry plane X orthogonal to the dispersion plane Y. The output waveguides are located in the vicinity of B, on a line orthogonal to the plane of the figure.

FIG. 12*a* shows a router including a planar arrangement of two waveguide gratings A and B. One or more input waveguides 1201 connect to free space region 1202, through planar waveguide grating A, free space region 1203, through planar waveguide grating B, free space region 1204 to output waveguides 1205. As shown the planar waveguide gratings A and B have opposite angular dispersion.

Shown in FIG. 12*b* is a planar arrangement including a transmissive waveguide grating and a reflective waveguide grating. Thus, FIG. 12*b* is formed by the combination of the waveguide grating of FIG. 2 with the reflective grating of FIG. 3.

In FIG. 12*c*, the waveform 1210 shows, illustratively, the variation in the transmission characteristics for the waveguide grating (element pattern) A with dispersion angle θ. In FIG. 12*c*, the waveform 1220 shows, illustratively, the variation in the transmission characteristics for different orders for waveguide grating A with changes in wavelength λ.

FIG. 13 shows an alternate wavelength router arrangement of FIG. 3 obtained by combining a reflective waveguide grating 1300 with a conventional grating 1301 (grating 201 of FIG. 2). In the same manner as discussed in FIG. 3, the purpose of the second grating 1300 is to transform each order produced by the first grating 1301 into a stationary image received efficiently by a separate output waveguide 1303.

What has been described is merely illustrative of the application of the principles of the present invention. Other methods and arrangements can be implemented by those skilled in the art without departing from the spirit and scope of the present invention.

APPENDIX

REFERENCES

[1] C. Dragone, An N×N Optical Multiplexer Using a Planar Arrangement of Two Star Couplers," IEEE Photon. Technol. Lett., 3, pp. 812–815, 1991. Also see C. Dragone, U.S. Pat. No. 5,039,993.

[2] C. Dragone, "Efficient Techniques for Widening the Passband of a Wavelength Router," J. of Lightwave Tech., Vol. 16, No. 10, pp. 1895–1906, October 1998.

[3] C. Dragone, U.S. Pat. No. 5,488,680.

[4] C. Dragone, "Optimum Design of a Planar Array of Tapered Waveguides," J. Opt. Soc. Amer. A., Vol. 7, No. 11, pp. 2081–2093, November 1990.

[5] C. Dragone, "Periodic Array with Nearly Ideal Element Pattern," U.S. Pat. No. 5,039,993.

[6] C. Dragone, patent application "Waveguide Array with Improved Efficiency for Wavelength Routers and Star Couplers in Integrated Optics," filed Jun. 30, 1998, Ser. No. 09/109,244.

[7] J. C-Y. Chen and C. Dragone, patent application "Optical Passband Filters," filed September 1997, Ser. No. 08/925, 515.

What is claimed is:

1. An optical wavelength router comprising an input optical link, an output optical link, and an imaging arrangement including two gratings of different orders and having essentially equal but opposite dispersions chosen so that an input wavelength transmitted from the input optical link to the output optical link essentially produces at the output optical link receiving aperture a stationary image whose intensity variation as a function of input wavelength produces a passband that is primarily determined by a transmission coefficient of the grating of higher order.

2. An optical wavelength router for transmission of a first wavelength channel from an input optical link to an output optical link comprising an imaging arrangement including a combination of two gratings that have different orders and have essentially equal but opposite dispersions such that an input wavelength transmitted from the input optical link essentially produces a stationary image at the output optical link and wherein the low order grating includes a reflecting or a transmitting surface having diffraction grooves.

3. The router of claim 1 including a plurality of output optical links and wherein each output optical link receives a particular order of the diffracted input wavelength signal.

4. The router of claim 1 wherein at least one of the two gratings is a transmissive grating.

5. The router of claim 1 wherein at least one of the two gratings is a reflective grating.

6. The router of claim 1 wherein an optical lens is used to direct the input wavelength from the input optical link to a first grating and an optical lens is used to direct the input wavelength from a second grating to the output optical link.

7. The router of claim 1 wherein the input and output optical links are selected from a group including a waveguide and an optical fiber.

8. The router of claim 1 wherein a first grating which receives the input wavelength from the input optical link has a diffraction grating order that is less than the diffraction grating order of a second grating that couples the input wavelength to the output optical link.

9. The router of claim 1 wherein a first grating which receives the input wavelength from the input optical link has a diffraction grating order that is greater than the diffraction grating order of a second grating that couples the input wavelength to the output optical link.

10. The router of claim 1 wherein the input optical link and a first grating of the two gratings are part of an integrated waveguide grating router.

11. The router of claim 10 wherein an output free space region of the integrated router includes a second grating of the two gratings formed as a reflective grating.

12. The router of claim 1 wherein the output optical link and a second grating of the two gratings are part of an integrated waveguide grating router.

13. The router of claim 1 further comprising a spatial filter located between the two gratings and adapted to attenuate wavelengths that are outside a passband of the transmission coefficient between each input and output waveguide.

14. The router of claim 13 wherein the spatial filter includes one or more lenses and an aperture stop for providing a rectangular aperture function to attenuate wavelengths that are outside a passband of the transmission coefficient.

15. The router of claim 1 including a plurality of input links and operated as a multiplexer, wherein a different optical wavelength signal is inputted to each optical link and a wavelength division multiplexed signal is outputted to the output optical link.

16. The router of claim 1 including a plurality of output links and operated as a demultiplexer wherein a wavelength division multiplexed (WDM) signal is inputted to the input optical link and a different optical wavelength signal of the WDM signal is outputted on each of the plurality of output optical links.

17. The router of claim 1 being an N by M router having N input optical links and M output optical links, where M and N are integers greater than one.

18. The router of claim 1 wherein the input optical link and a first grating of the two gratings and the output optical link and a second grating of the two gratings are part of an integrated waveguide grating router.

19. A method of demultiplexing a wavelength division multiplexed (WDM) signal comprising the steps of:

receiving a WDM signal, forming therefrom an incident plane wave, and distributing it, transforming a received incident plane wave into a set of planes waves of different orders having a first dispersion value, and diffracting the set of plane waves with a second dispersion value equal to and opposite of the first dispersion value and forming therefrom different wavelength signal of the WDM signal.

20. A method of multiplexing a plurality of wavelength signals into a wavelength division multiplexed (WDM) signal comprising the steps of:

transforming each of the plurality of wavelength signals into a set of planes waves having a first dispersion value and distributing the set of planes waves, and diffracting the set of plane waves with a second dispersion value equal to and opposite of the first dispersion value and forming therefrom the WDM signal.

* * * * *